United States Patent [19]
Cantoni et al.

[11] Patent Number: 6,060,838
[45] Date of Patent: May 9, 2000

[54] ILLUMINATION DEVICE

[75] Inventors: James Louis Cantoni, Glastonbury, Conn.; Wayne E. Maw, Jr., Somerville, Mass.

[73] Assignee: Creative Concepts and Consulting Corporation, Glastonbury, Conn.

[21] Appl. No.: 08/849,158

[22] PCT Filed: Nov. 21, 1995

[86] PCT No.: PCT/US95/15198

§ 371 Date: Jul. 17, 1997

§ 102(e) Date: Jul. 17, 1997

[87] PCT Pub. No.: WO96/16391

PCT Pub. Date: May 30, 1996

[51] Int. Cl.[7] .................................................. H05B 37/02
[52] U.S. Cl. ........................... 315/159; 315/156; 362/27; 361/174
[58] Field of Search ..................... 315/150, 156, 315/159, 87; 362/27, 31, 83.3, 227; 361/174, 175, 190; 250/214

[56] References Cited

U.S. PATENT DOCUMENTS

| | | |
|---|---|---|
| 394,386 | 12/1888 | Nicholson . |
| 1,048,343 | 12/1912 | Rice . |
| 1,446,180 | 2/1923 | Herrick . |
| 1,535,823 | 4/1925 | Goodwin . |
| 1,840,419 | 1/1932 | Walling . |
| 2,062,887 | 12/1936 | Karst .......................................... 40/132 |
| 2,216,424 | 10/1940 | Stehlin ........................................ 40/133 |
| 2,225,961 | 12/1940 | Rundberg ................................... 40/132 |
| 2,658,295 | 11/1953 | Young et al. ............................... 40/125 |
| 3,015,900 | 1/1962 | Frink et al. ................................. 40/130 |
| 3,083,317 | 3/1963 | Fish et al. ................................... 315/87 |
| 3,188,761 | 6/1965 | Harrold ....................................... 40/130 |
| 3,212,080 | 10/1965 | Gurian et al. .......................... 40/544 X |
| 3,404,474 | 10/1968 | Johnson ...................................... 40/130 |
| 3,510,976 | 5/1970 | Pauline et al. .............................. 40/132 |
| 3,562,534 | 2/1971 | Jarret et al. ............................... 250/205 |
| 3,564,332 | 2/1971 | Blakeslee ................................. 315/154 |
| 3,654,514 | 4/1972 | Kappenhagen .......................... 315/156 |
| 3,968,584 | 7/1976 | Kingston ................................. 40/130 K |
| 3,996,475 | 12/1976 | Rodriguez ............................... 250/551 |
| 4,327,511 | 5/1982 | Rodriguez ................................. 40/544 |
| 4,386,476 | 6/1983 | Schulman ................................. 40/546 |
| 4,424,449 | 1/1984 | O'Brill .................................... 250/461.1 |
| 4,611,265 | 9/1986 | Davis ...................................... 362/145 |
| 4,686,505 | 8/1987 | Vanderburg ............................. 340/331 |
| 4,843,525 | 6/1989 | Williams ................................. 362/157 |
| 4,901,461 | 2/1990 | Edwards et al. .......................... 40/575 |
| 4,903,172 | 2/1990 | Schöniger et al. ....................... 362/31 |
| 4,947,989 | 8/1990 | Horton ..................................... 206/387 |
| 4,965,875 | 10/1990 | Korte et al. ............................. 362/217 |
| 4,994,941 | 2/1991 | Wen ......................................... 362/26 |
| 5,007,190 | 4/1991 | Shyu ......................................... 40/564 |
| 5,009,019 | 4/1991 | Erlendsson et al. ...................... 40/541 |
| 5,075,826 | 12/1991 | Lan ........................................ 362/83.3 |
| 5,099,593 | 3/1992 | Hannula ................................... 40/552 |
| 5,169,227 | 12/1992 | Korte et al. ............................. 362/226 |
| 5,195,016 | 3/1993 | Powers ................................... 361/175 |
| 5,267,404 | 12/1993 | Kizy ......................................... 40/545 |

*Primary Examiner*—Haissa Philogene
*Attorney, Agent, or Firm*—McCormick, Paulding & Huber LLP

[57] ABSTRACT

An illumination device employs electroluminescent lamps which may be used alone or may cooperate with mask layers to define one or more rows of illuminated indicia which may be easily replaced to provide other types and colors of indicia. A circuit including a photocell automatically energizes the device so as to operate above or below a threshold level of visual illumination depending on the intensity of surrounding light shining on the device. The circuit can be either hardwired to a structure, connected to a standard power cord or have an integral plug for connection to a conventional outlet. One or more interconnectable housings may be provided. The locations of the interconnectable housings may be varied relative to each other to create a unique visual impact when illuminating indicia.

25 Claims, 11 Drawing Sheets

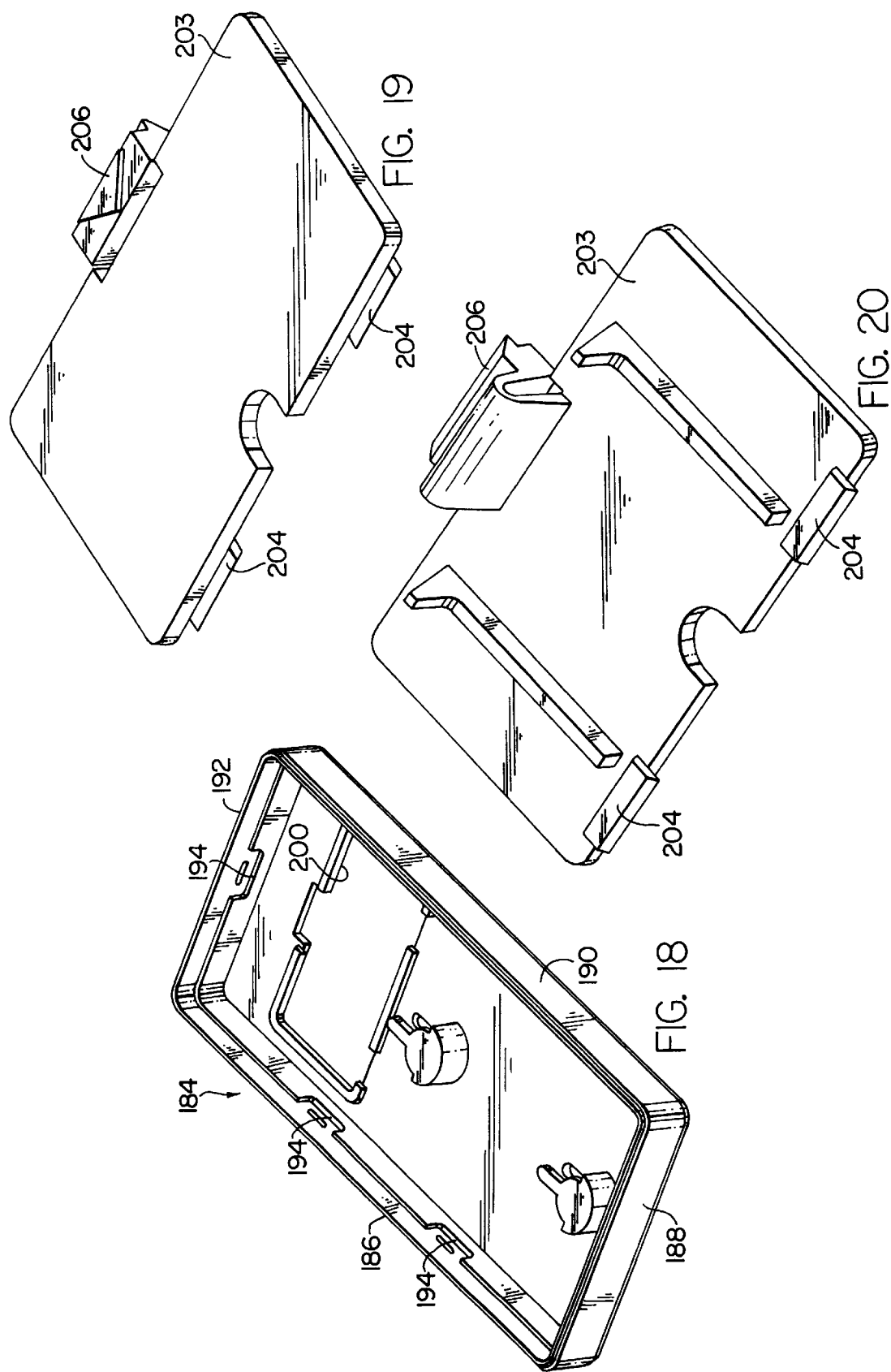

ILLUMINATION DEVICE

BACKGROUND OF THE INVENTION

The present invention relates generally to an illumination device for illumination of the surrounding area or displaying indicia, such as, names, graphic symbols, logos, seasonally expressive indicia, culturally expressive indicia, and particularly numbers or letters for identifying street signs and residential, commercial and industrial structures by street address. More particularly, the invention relates to an improvement in such device whereby the device itself or indicia displayed thereon are clearly visible day or night whether the device is located inside or outside of a structure being identified.

The need to clearly display a house address, street sign or license plate is well-known. For example, such a device is useful for an individual in an unfamiliar neighborhood at night looking for a certain street and address, and is also useful for aiding and assisting emergency/rescue personnel e.g., police, fire, ambulance workers in quickly and more easily finding a license plate, street, house or structure. There is also a need to illuminate the interior of a structure, such as by a night light.

It is often the desire of a purchaser or consumer of an illumination device to choose a particular indicia design, based on a color preference and/or a desired graphic design. It is also desirable to provide snap-in type illumination cartridges with such device capable of providing light of different colors according to the preference of the owner or consumer.

SUMMARY OF THE INVENTION

The invention resides in an illumination device comprising a housing having a base. A support is located within the housing and adjacent to the cover member. At least one light source is located within the housing and has a top surface and a bottom surface of which the bottom surface is supported by the supporting surface and the top surface projects light through the cover member. Means for releasably connecting the at least one light source to a power supply is also provided. In addition, at least one mask layer may be provided having opaque and transparent regions for covering one or more of the light sources to selectively block light emanating from the light sources to define indicia. The illumination device may also be provided with a transparent cover member for protecting the device's inner contents.

Provided is a circuit for automatically turning a lighting device on or off depending on the level of brightness external to the device. The circuit comprises a photocell including a first terminal and a second terminal. The first terminal of the photocell is to be coupled to a first terminal of an alternating current (AC) power supply. A diode is provided of which the anode of the diode is coupled to the second terminal of the photocell. A resistor, preferably from about one million ohms to about four million ohms, including a first terminal and a second terminal has its first terminal coupled to the second terminal of the photocell, and the second terminal of the resistor is coupled to the cathode of the diode. Provided is a silicon-controlled rectifier (SCR). The anode of the SCR is coupled to the cathode of the diode; the cathode of the SCR is coupled to the first terminal of the photocell, and the gate of the SCR is coupled to the second terminal of the photocell. One or more light sources having first and second terminals are included. The first terminals of the light sources are coupled to one another, and the second terminals of the light sources are coupled to one another to place the light sources in parallel to one another. The first terminals of the one or more light sources are also coupled to the cathode of the diode, and the second terminals of the light sources are to be coupled to the second terminal of the power supply.

During a first half cycle of the AC power supply when the second terminal of the power supply is positive with respect to the first terminal of the power supply and the level of the intensity of light impinging on the photocell is below a predetermined level, the photocell generates a relatively high resistance of about forty thousand ohms so that current flowing through the approximately one to four million ohm resistor and the photocell establishes a sufficient bias voltage from the gate of the SCR relative to its cathode to turn on the SCR and establish a substantial current flow from the second terminal of the power supply, through the light sources from the second terminal to the first terminal of the light sources, through the SCR and to the first terminal of the power supply. During a second half cycle of the power supply when the first terminal of the power supply is positive with respect to the second terminal of the power supply, the SCR turns off to be non-conductive and a substantial current flow is established from the first terminal of the power supply, through the photocell, through the diode, through the light sources from the first terminals to the second terminals of the light sources and to the second terminal of the power supply, thereby providing substantial full-wave current to the light sources to generate a visual illumination of the light sources when the level of light intensity impinging on the photocell is below a predetermined level.

During a first half cycle of the AC power supply when the second terminal of the power supply is positive with respect to the first terminal of the power supply and the level of intensity of light impinging on the photocell is above a predetermined level, the photocell generates a sufficiently low resistance of about two thousand ohms with respect to the resistor so that current flowing through the resistor and the photocell establishes an insufficient bias voltage from the gate of the SCR relative to its cathode to turn on the SCR, whereby the SCR is off and non-conductive and the resistor is of a sufficiently high resistance so that minimal current flows from the second terminal of the power supply, through the light sources from the second terminals to the first terminals of the light sources, through the resistor and the photocell and to the first terminal of the power supply so that the light sources are in-effect not lighted during the first AC half cycle. During a second half cycle of the power supply when the first terminal of the power supply is positive with respect to the second terminal of the power supply, current flows through the light sources similar to when the level of light intensity impinging on the photocell is below a predetermined level, whereby half-wave current flows through the light sources to provide less than a threshold level of visual illumination (i.e., below human perception), and in effect establish the light sources in an off condition.

The illumination device may comprise interconnectable housings each displaying one or more indicia such that the locations of the housings may be varied relative to each other to provide a unique visual impact.

One advantage of the present invention is that the illumination device automatically provides a visual level of illumination when the device surrounding becomes dark, and the device automatically provides substantially no visual illumination when the device surrounding becomes relatively bright.

Another advantage of the invention is to provide a self-contained, pre-wired illumination device capable of being readily plugged into a standard wall socket.

Yet another advantage of the invention is to provide several different mediums for defining indicia which may be illuminated by the invention.

Yet another advantage of the invention is to provide the option of the owner or consumer to select one or more rows of indicia.

Still another advantage of the invention is to provide an illumination device capable of being hardwired into the structure by removing a pre-wired cord and directly connecting the structure's circuit to the device.

Other advantages of the present invention will become apparent in view of the following detailed description and accompanying drawings.

BRIEF DESCRIPTION OF THE DRAWINGS

FIG. 18 is an inside perspective view of the base of FIG. 17.

FIG. 19 is an outside perspective view of a battery door of the interconnectable housing.

FIG. 20 is an inside perspective view of the battery door of FIG. 19.

DETAILED DESCRIPTION OF THE PREFERRED EMBODIMENTS

Figure 1:
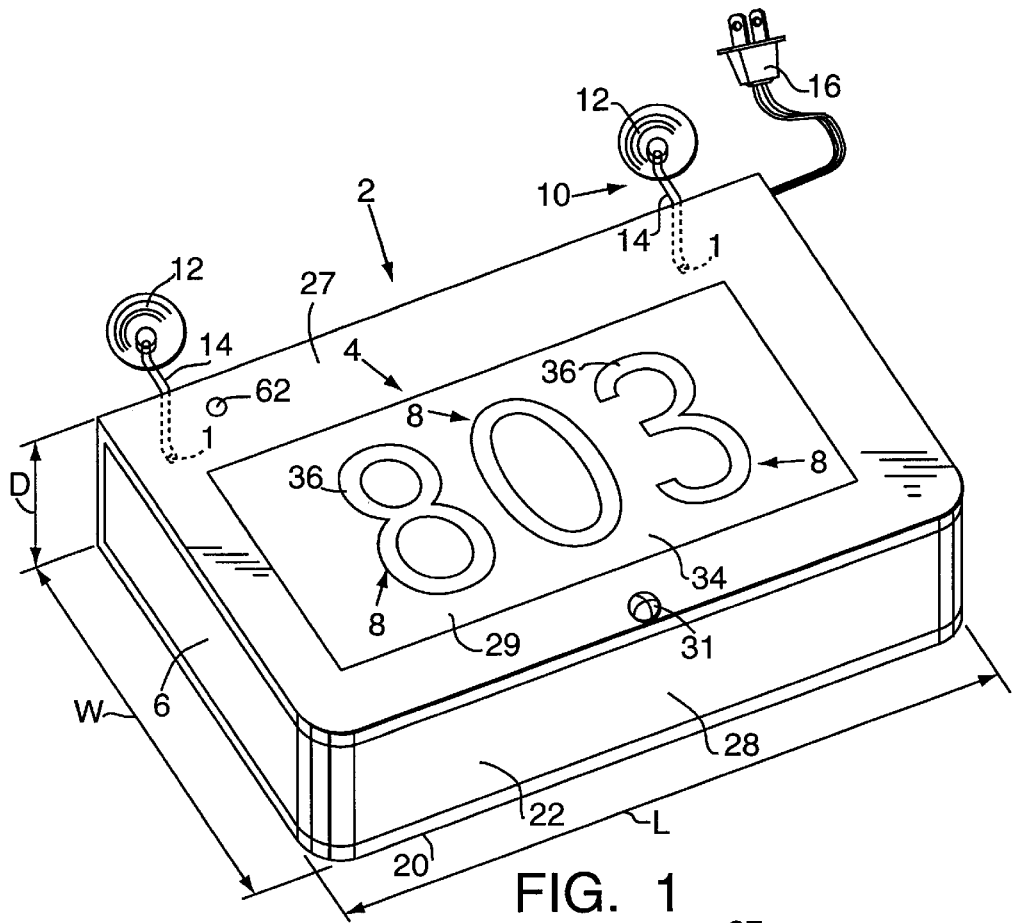
FIG. 1 is a prospective view of the illumination device embodying the invention.
Figure 2:
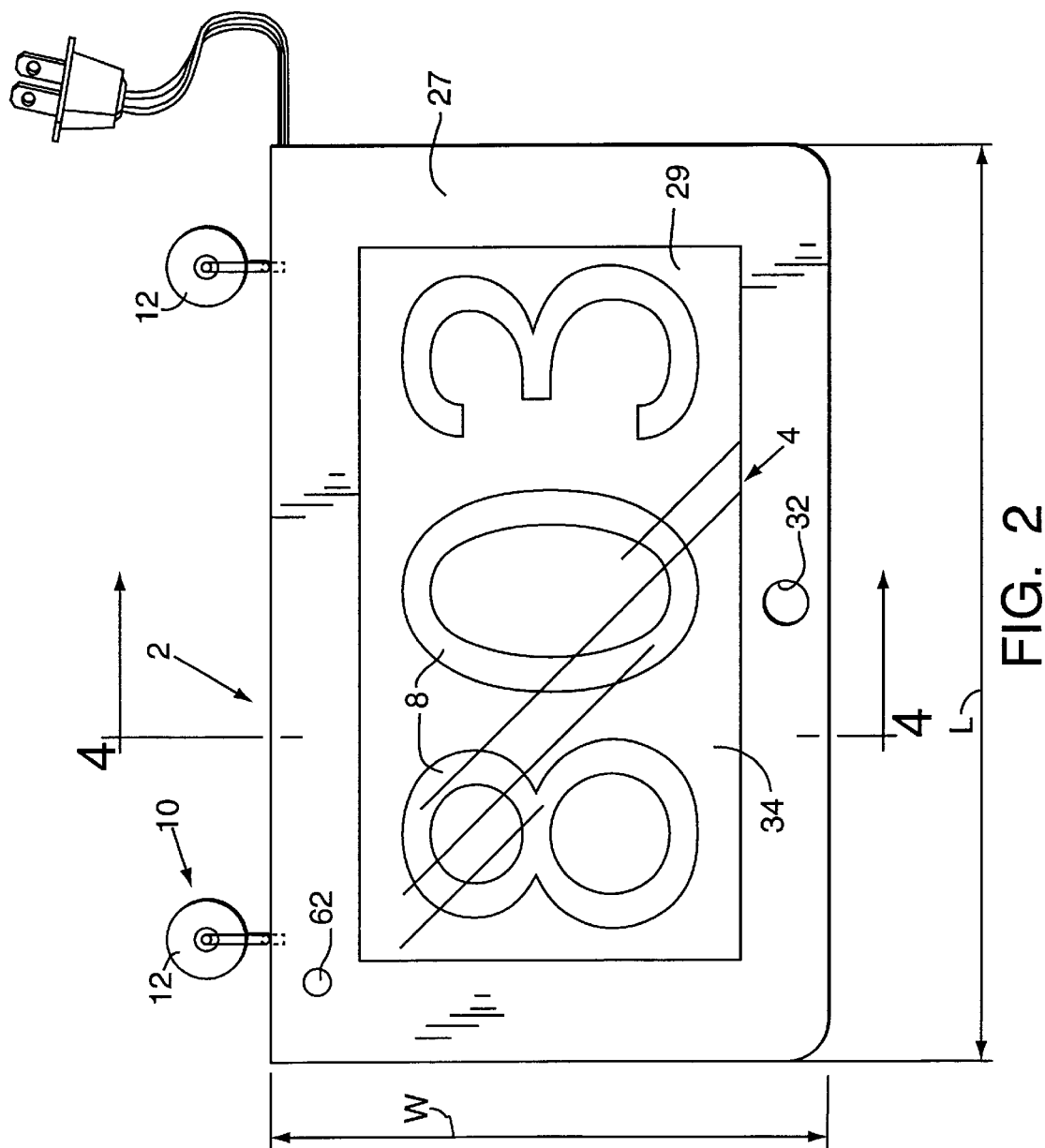
FIG. 2 is a top plan view of the illumination device of FIG. 1.
Figure 3:
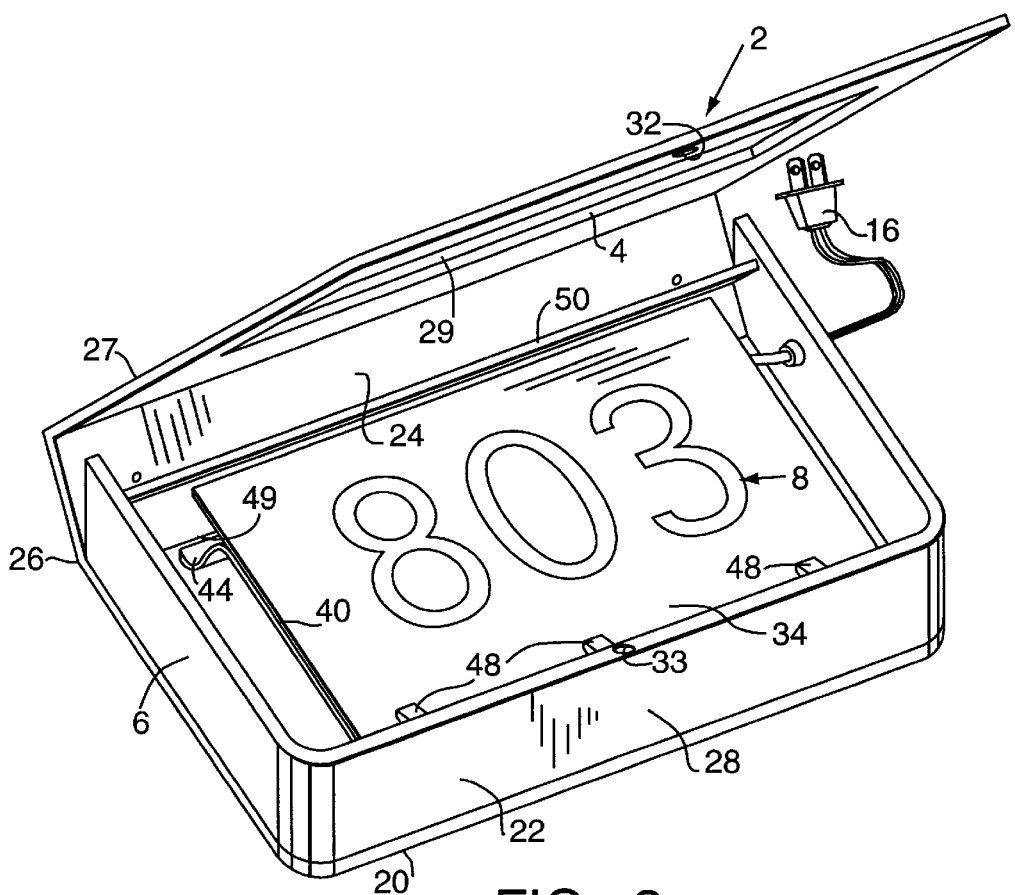
FIG. 3 is a prospective view of the illumination device of FIGS. 1 and 2 shown with the top partially uncovered.

FIGS. 1–3 illustrate an illumination or indicia display device indicated generally by the reference numeral 2.

The device 2 includes a generally rectangularly-shaped box 6 having a display window 4 in which indicia 8, 8 are shown. The device 2 further includes means 10, 10 disposed at either end of the device for attaching the device to a surface, such as a window or wall. Referring to FIG. 1, an example of means 10 includes a suction cup 12 connected to the device through an attachment arm 14. As shown in phantom line in FIG. 1, each attachment arm is formed to contour a back surface of the device and be received in a correspondingly sized and shaped hole 1,1 located in the back of the display device. This allows the display window 4 of the device to confront the attachment surface, e.g. glass pane, to which surface the suction cups are attached. In this way, the device can be displayed through a structure's window if desired. Alternatively, if it is desired to hardwire the device to the structure, conventional connectors, such as, screws, can be used to secure the display device to the structure by utilizing the preformed holes 1,1. The device 2 includes an electrical cord 16 for connection to a power source. The electrical cord is connectable to any standard household outlet.

The device of FIG. 1 illustrates a three-indicia display having width W equal to about five inches, a length L equal to 6¼ inches, and having a depth D equal to about 0.75 inches. The dimension L is variable depending on the number of indicia being displayed as follows:

| Embodiment | Length | Indicia |
|---|---|---|
| Single Indicia model | 2.25" | 2.0" × 1 indicia |
| Two Indicia model | 4.50" | 2.0" × 2 indicia |
| Three Indicia model | 6.25" | 2.0" × 3 indicia |
| Four Indicia model | 8.75" | 2.0" × 4 indicia |
| Five Indicia model | 11.0" | 2.0" × 5 indicia |

These dimensions enable the device to provide relatively large size indicia while at the same time providing a compact and easy-to-use shape. The multi-indicia models above relate to indicia which are arranged horizontally with respect to each other from a viewer's frame of reference. However, indicia may also be arranged vertically with respect to each other from a viewer's frame of reference.

Figure 4:
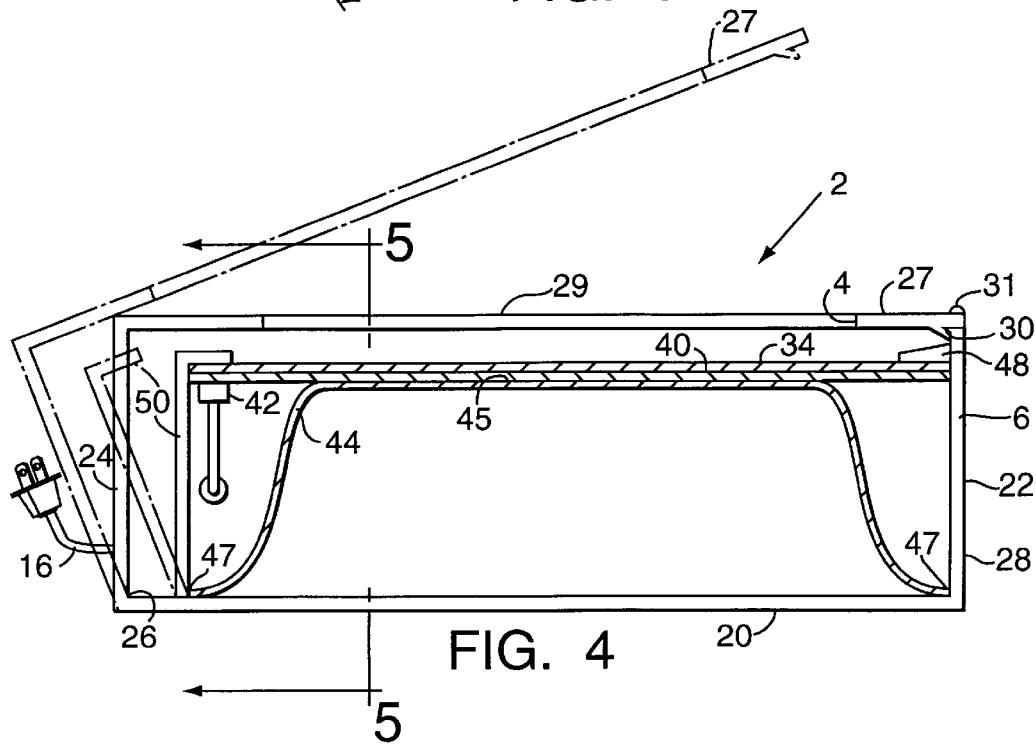
FIG. 4 is a vertical section of the device along lines 4—4 of FIG. 2.

As best illustrated in FIGS. 1–3, the device 2 is comprised of a base member which is preferably integrally-molded to a generally U-shaped upstanding wall 22. The generally U-shaped upstanding wall opens to a hinge-like back plate 24, which is connected by a hinge 26 to the base member. The back plate 24 is rigidly connected with top cover member 27 and is correspondingly sized and shaped to fit over the upstanding U-shaped wall 22, as shown in FIG. 1. As illustrated in FIG. 4, the top cover member 27 snap-fits in place with a transversely-extending forwardmost wall 28 of the upstanding wall 22 and releasably locks with the aid of a standard compressible lip running co-extensively with the wall 28. For extra protection against accidental opening of the device or theft of the inside parts, the top cover member is preferably held in place to the wall 22 by means of a screw 31. As shown in FIGS. 2 and 3 respectively, a threaded hole 32 in the cover member 27 and a threaded hole in the wall 22 are for receiving the screw to hold the cover member firmly to the wall 22. As shown in FIGS. 1 and 2, the cover member 27 includes the display window 4 and is defined by a transparent window member 29 made from plastic or the like secured within a recess in the cover member using appropriate means such as adhesive.

The indicia 8, 8 are defined on a mask layer 34 which is a sheet of thin material having printed opaque and non-printed transparent regions which define the indicia. The regions 36 on the mask layer 34 define the indicia 8, 8. Disposed below the mask layer 34 are one or more electroluminescent lamps 40, 40 which are connected to the electrical cord 16 through electrical connectors 42, 42 shown in FIG. 4, which are mounted to the housing of the device 2 adjacent a top end of the lamp. The electroluminescent lamps preferably take the form of flat panels, as shown in FIG. 4, but may take other shapes. The connectors 42, 42 allow the electroluminescent lamps 40, 40 to readily slide into and out of engagement with it, which will hereinafter become more apparent. Alternatively, the lamps may be permanently attached to the housing by appropriate means such as soldering or press-fitting. Electroluminescent lamps are preferably used because of their insignificant power consumption with respect to incandescent bulbs (about ¹⁄₁₀ the power consumption) and their relatively low heat generation. Furthermore, electroluminescent lamps have a life expectancy of more than 10,000 hours as opposed to incandescent bulbs (about 500 hours) and fluorescent lamps (about 2,500 hours). An electroluminescent lamp used has the following characteristics:

| Electroluminescent Lamp (EL) Characteristics | |
|---|---|
| Operating voltage Vrms | 24–250 |
| Operating Frequency Range Hz | up to 5,000 |
| Dynamic Capacitance Range (lamp-size-dependent) uf | .006–.024 |
| Current Phase Angle | 78 Leading |
| Power Consumption @ 115 V, 400 Hz (lamp-size-dependent) | 40 mW–160 mW |

Of course, the above EL characteristics are set forth in an illustrative sense and are not meant to be taken in a limiting sense.

The mask layer as described need not be limited to a printed material, but may also be realized in other forms which are placed over the lamp such as a separate rigid insert or a flexible overlay comprising both opaque and transparent material which cooperate to define the indicia. In addition, the insert or overlay may be either permanently in-place in the device or may be easily changeable with another insert or overlay.

When using a mask layer, the area within the indicia may be defined by either the opaque region of the mask layer or an exposed region of the electroluminescent lamp shining through a transparent region of the mask layer.

Figure 5:
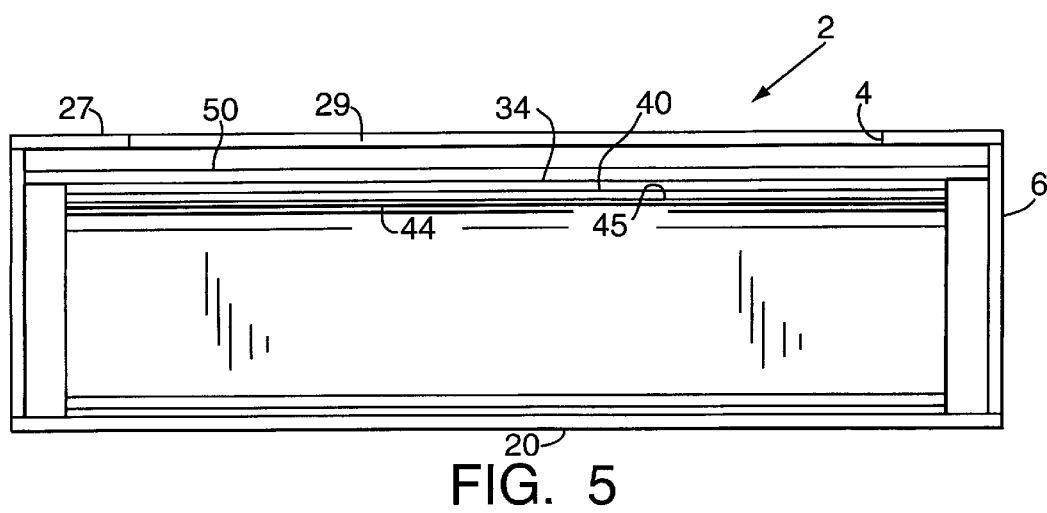
FIG. 5 is a vertical sectional view through the illumination device along lines 5—5 of FIG. 4.

As illustrated in FIG. 4, the electroluminescent lamp 40 and the mask layer 34 are supported within the device 2 by a support 44 having a support surface 45. The support 44 is secured to the base member at its opposite ends 47,47. Situated along the inner surface of the forwardmost wall 28 are a number of holding members 48, 48 (only one shown) which are integrally formed with the wall 28 and are located along the longitudinal length of the wall. Each of the holding members extends over the support surface 45 of the support 44. The holding members 48, 48 at their lower edges are spaced a slight distance above the support surface 45 of the support 44 to allow sufficient clearance for the electroluminescent lamp 40 and the mask layer 34 to be held between the holding members 48, 48 and the support surface 45. Disposed adjacent the end of the support surface 45 opposite the holding members 48, 48 is a pivotal bracket 50 which has an upper end portion cantilevered outwardly horizontally over the support surface 45 and is spaced therefrom in order to receive the electroluminescent lamp 40 therebetween. The bracket 50 has a lower depending end which is pivotally secured to the base member generally at 47 where the juxtaposed support 44 secures to the base member 20. As illustrated in FIG. 4 in phantom line, the bracket 50 is capable of pivoting outwardly away from the support 44 to allow the quick removal and/or insertion of a new electroluminescent lamp. As is best seen in FIG. 5, the top cantilevered portion of the bracket 50 extends generally over the entire length of the electroluminescent lamp 40 so as to hold it securely in position below the display window 4.

Figure 6:
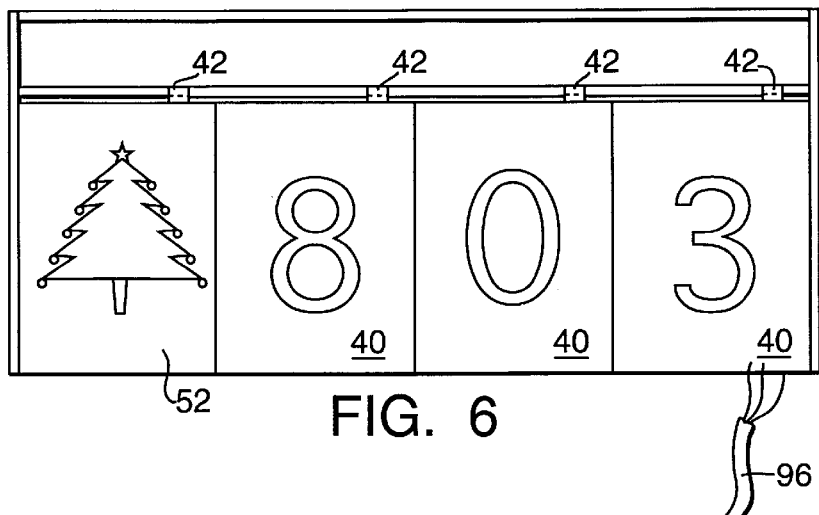
FIG. 6 is an alternative embodiment of the invention in which separate, insertable and removable lamps are used instead of a single illumination lamp.

Referring now to FIG. 6 illustrating an alternative embodiment of the invention, a plurality of electrical connectors 42, 42 are disposed in line with one another along the edge of the bracket 50. These connectors are spaced such that each services an individual electroluminescent lamp which is appropriately sized and shaped to fit a given region of the support 44. In the illustrated example, the device shown is capable of receiving four lamps. Three lamps 40, 40, 40 cooperate to provide a three digit address "803", and a fourth lamp 52 provides a decorative seasonal-expressive indicia, such as the Christmas tree shown in FIG. 6. Lamps of different colors may be substituted for one another. Also, the mask layer 34 can either be a positive or negative image defining the indicia 8, 8.

Figure 7:
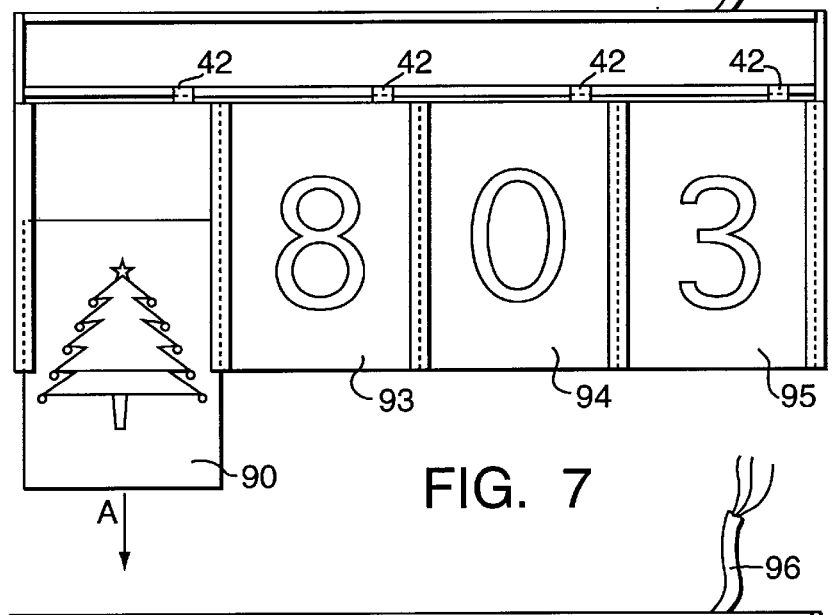
FIG. 7 illustrates another embodiment of the device where a transparent insert is being removed.

FIG. 7 shows another embodiment of the device using transparent inserts defining indicia which can be easily interchangeable over one or more electroluminescent lamps. For example, insert 90 defines a Christmas tree which was inserted into the device over lamp 91 during the Christmas season. When the Christmas season is over the insert 90 can be easily removed from the device in the direction denoted by the arrow A. The device may include one EL lamp for each insert, or may include fewer lamps or even a single lamp for illuminating the four inserts shown.

Figure 8:
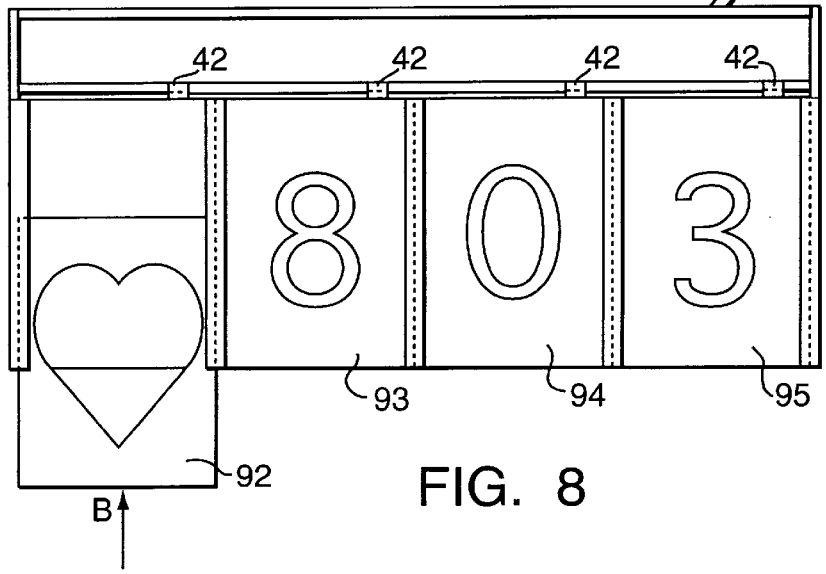
FIG. 8 illustrates the embodiment of FIG. 7 where another transparent insert is being inserted.

FIG. 8 shows the device of FIG. 7 where another insert 92 replaces the Christmas tree insert by being inserted into the device in the direction denoted by the arrow B. In this example, insert 92 defines a heart which is used in anticipation of Valentine's Day. A blank may also be inserted between holiday seasons. Of course, inserts 93, 94 and 95 are also replaceable if desired. This embodiment shows three wires referenced generally at 96 for being hardwired to a structure. An alternate embodiment could include a power cord to be inserted into a standard wall socket. The device may include a transformer (not shown) to step-down the AC voltage, for example to 9 volts, for powering the EL lamp.

Figure 9:
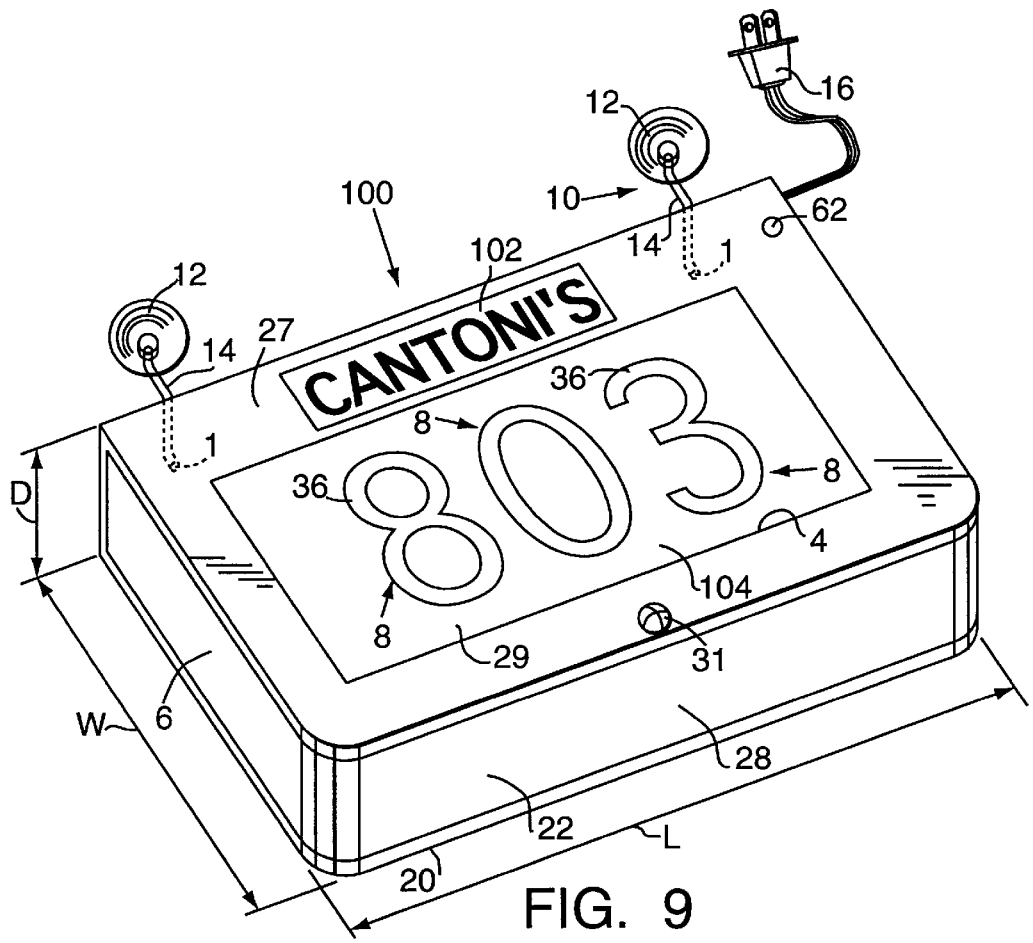
FIG. 9 schematically illustrates another embodiment of the device incorporating two rows of indicia.

FIG. 9 schematically illustrates yet another embodiment of the illumination device referenced as 100 comprising two rows of indicia. A top row of indicia is useful for displaying one type of information, such as an addressee's name "CANTONI'S" defined by mask layer 102. A lower row of indicia is useful for displaying another type of information, such as an address number "803" defined by mask layer 104. The mask layers may be in the form of a printed material, a rigid insert or a flexible overlay as was previously discussed. Although the mask layers for each row shown in FIG. 9 are of a single piece, a separate mask layer could be used for each letter or number.

Figure 10:
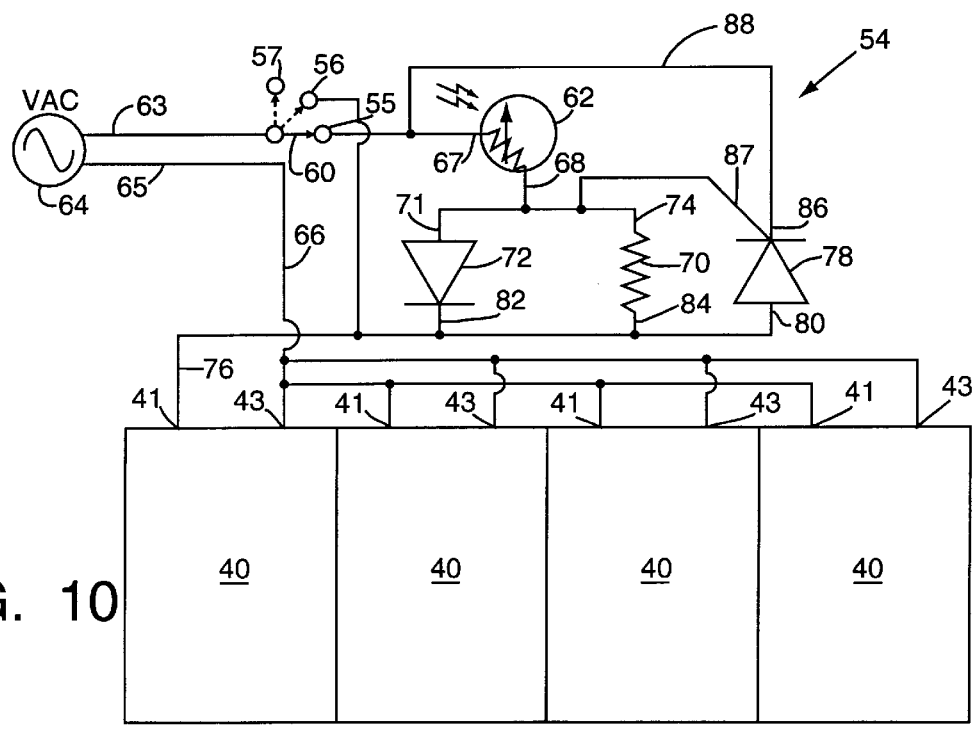
FIG. 10 is a schematic drawing showing a light sensing circuit of the invention.

FIG. 10 illustrates a light sensing circuit 54 for controlling the illumination device 2. The circuit may be placed anywhere within the device so as to sense the level of light intensity outside of the device. Three modes of operation for the circuit 54 may be selected by way of a switch 60 which is mounted to the housing of the device. When the switch engages contact 55, the automatic light sensing circuit is enabled which is discussed more fully below. When the switch engages contact 56, as shown in phantom line in FIG. 10, an always-illuminating mode of the light sensing circuit is enabled, thereby energizing electroluminescent lamps 40, 40 above a threshold level of visual illumination (i.e., above human perception) regardless of lighting conditions. Finally, when the switch engages contact 57 as shown in phantom line, the circuit is disabled regardless of lighting conditions. Selection of each different mode depends upon user preference.

The light sensing circuit 54 includes a light-sensing means, such as a photocell 62 having a first terminal 67 and a second terminal 68. The second terminal 68 of the photocell is coupled to an anode 71 of a diode 72, to a first terminal 74 of a resistor 70, and to a gate 87 of a silicon-controlled rectifier (SCR) 78. The light sensing means 62, the diode 72, the resistor 70 and the SCR 78 form a means for regulating current. A cathode 82 of the diode 72 is coupled to a second terminal 84 of the resistor 70, and to an anode 80 of the SCR 78. A cathode 86 of the SCR is coupled to the first terminal 67 of the photocell 62 via a line 88. One or more light sources, such as electroluminescent lamps 40, 40 are connected in parallel with one another. First terminals 41, 41 of the lamps are coupled to the cathode 82 of the diode 72, the second terminal 84 of the resistor 70, and the anode 80 of the SCR 78 via a line 76. Second terminals 43, 43 of the lamps are to be coupled to a second terminal 65 of a power source, such as alternating current (AC) power supply 64 via a line 66.

Of course, other power sources may be used. For example, a DC source may be coupled to a DC to AC converter. Alternatively, a solar cell may be coupled to an energy saving device, such as a capacitor, to save energy during the day, and to power the illumination device at night.

Let us refer now to the automatic mode of operation of the circuit of FIG. 10 when the switch 60 engages the terminal 55. During a first half cycle of the AC power supply when the second terminal 65 of the power supply 64 is positive with respect to the first terminal 63 of the power supply and the level of the intensity of light impinging on the photocell 62 is below a predetermined level, the photocell generates a relatively high resistance of about forty thousand ohms so that current flowing through the resistor 70 and the photocell 62 establishes a sufficient bias voltage from the gate 87 of the SCR 78 relative to its cathode 86 to turn on the SCR and establish a substantial current flow from the second terminal 65 of the power supply 64, through the light sources 40, 40 from the second terminals 43, 43 to the first terminals 41, 41 of the light sources, through the SCR 78 and to the first terminal 63 of the power supply 64, and during a second half cycle of the power supply 64 when the first terminal 63 of the power supply is positive with respect to the second terminal 65 of the power supply, the SCR 78 turns off to be non-conductive and a substantial current flow is established from the first terminal 63 of the power supply, through the photocell 62, through the diode 72, through the light sources 40, 40 from the first terminals 41, 41 to the second terminals 43, 43 of the light sources and to the second terminal 65 of the power supply, thereby providing substantial full-wave current to the light sources so as to energize the light sources above a threshold level of visual illumination (i.e., above human perception) when the level of light intensity impinging on the photocell is below a predetermined triggering level.

During a first half cycle of the AC power supply when the second terminal 65 of the power supply 64 is positive with respect to the first terminal 63 of the power supply and the level of intensity of light impinging on the photocell 62 is above a predetermined triggering level, the photocell generates a sufficiently low resistance of about two thousand ohms with respect to the resistor 70 so that current flowing through the resistor and the photocell establishes an insufficient bias voltage from the gate 87 of the SCR relative to its cathode 86 to turn on the SCR, whereby the SCR is off and non-conductive and the resistor is of a sufficiently high resistance (from about one million ohms to about four million ohms) so that minimal current flows from the second terminal 65 of the power supply, through the light sources 40, 40 from the second terminals 43, 43 to the first terminals 41, 41 of the light sources, through the resistor 70 and the photocell 62 and to the first terminal 63 of the power supply so that the light sources are substantially not energized during the first AC half cycle.

During a second half cycle of the power supply when the first terminal 63 of the power supply 64 is positive with respect to the second terminal 65 of the power supply, current flows through the light sources similar to when the level of light intensity impinging on the photocell is below a predetermined level. Because only a half-wave current flows through the electroluminescent lamps, the light sources provide less than a threshold level of visual illumination (i.e. below human perception) so as to visually appear to be "off". Although an SCR was used to illustrate the control of power to electroluminescent lamps, other equivalent circuits or gated components, such as a triac, may be substituted without departing from the scope of the invention.

Let us refer now to FIG. 10 when the switch 60 engages the terminal 56 in the always-illuminating condition. The switch engages terminal 56 to provide a current flow from the first terminal 63 of the power supply 64, along the line 76, through the lamps 40, 40, and back to the second terminal 65 of the power supply 64 via the line 66. As can be seen, the current flowing through the lamps is independent of the level of light intensity impinging on the photocell 62, thereby maintaining the lamps in a visually illuminating condition regardless of the light conditions external to the device.

When the switch of FIG. 10, engages the terminal 57, the first terminal of the current source is disconnected, thereby disabling the lamps 40, 40 regardless of the lighting conditions external to the device.

Figure 11:
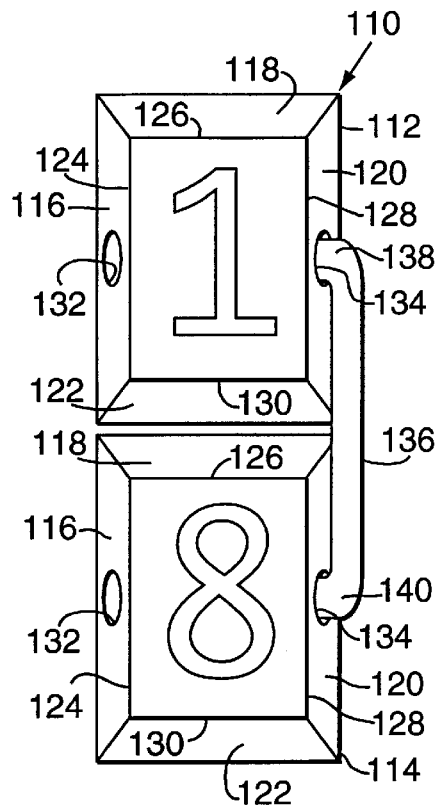
FIG. 11 schematically illustrates interconnectable housings in top-bottom relationship.
Figure 12:
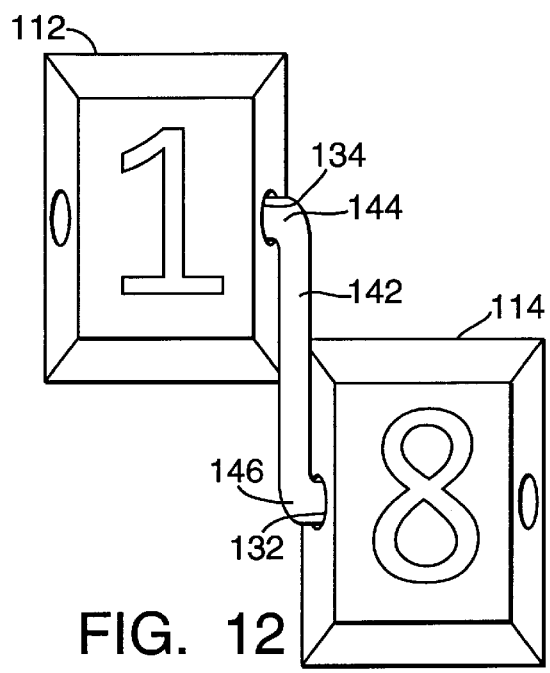
FIG. 12 schematically illustrates interconnectable housings in a staggered side-by-side relationship.
Figure 13:
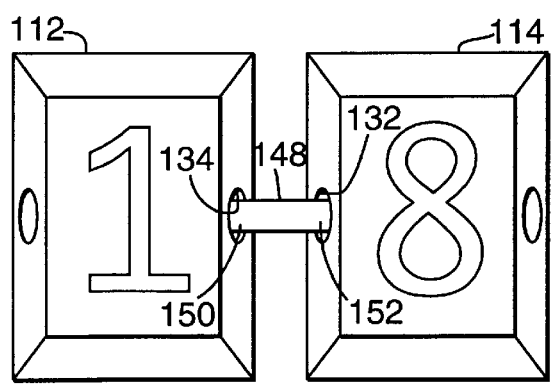
FIG. 13 schematically illustrates interconnectable housings in a direct side-by-side relationship.

With reference to FIGS. 11 through 13, an illumination device may comprise one or more housings or housings each providing an electroluminescent lamp which may be illuminated by itself or be used to illuminate associated indicia such that the housings cooperate to form an overall illumination device. For example, each housing may provide a single numerical character which cooperates with similar characters associated with other housings to define a street address number.

Each housing may be a self-contained unit having a light sensing circuit and means for receiving power from a direct power source. For example, each housing may be hardwired to AC wires, plugged into an AC power cord or outlet, or provided with a DC power source, such as a battery that is coupled to an inverter to convert power from DC to the AC to activate the light sensing circuit. However, the illumination device preferably comprises one "primary" housing providing the light sensing circuit and AC power to be shared by one or more "secondary" housings.

The primary and secondary housings are interconnectable by means of electrical wiring, preferably 18 AWG or less insulated AC power cords. The flexibility of the power cords permits the housings to be placed in variable locations relative to each other to provide different and distinct visual impacts to be illustrated in FIGS. 11–13.

Turning now to FIG. 11, an illumination device comprising a primary and secondary housing is indicated generally by the reference numeral 110. The device 110 comprises first and second housings 112 and 114. Sidewalls 116,118,120 and 122 of each of the housings 112 and 114 preferably extend downwardly from respective edges 124,126,128 and 130 in planes transverse to the plane of drawing, but for clarity of illustration, the sidewalls appear to extend outwardly from the respective edges. The sidewalls 116 and 120 of both the first and second housings define respective interconnection openings to receive power cords, such as AC power cord 136 so that a light sensing circuit provided in a primary housing may electronically control not only its own electroluminescent lamp, but also an electroluminescent lamp in the secondary housing.

For example, suppose that the first and second housing 112 and 114 are respectively primary and secondary. The primary housing is powered by either an internal DC battery (not shown) or by an external AC source, preferably through a hidden AC connection behind the primary housing. The housing may include a transformer (not shown) for stepping-down the AC voltage to an appropriate level, for example 9 volts, to energize the EL lamp. The power cord 136 has a first end 138 received within the interconnection opening 134 of the primary housing 112, and has a second end 140 received within the interconnection opening 134 of the secondary housing 114. The power cord 136, therefore, allows a light sensing circuit (not shown) within the primary housing 112 to illuminate an electroluminescent lamp provided in the remote, secondary housing 114. Of course, the primary housing could have been selected to be the second housing 114 and the secondary housing to be the first housing 112.

FIGS. 11 through 13 illustrate some of the different relative positions that can be formed between the interconnectable housings. For example, referring again to FIG. 11, the flexible power cord of a predetermined length is connected to the housings and is bent in such a way that the first and second housings 112 and 114 are in a top-bottom relationship for a desired visual impact.

Referring to FIG. 12, a flexible cord 142 has a first end 144 received through the opening 134 of the first housing 112 and has a second end 146 received in the opening 132 of the second housing 114. The length of the cable is preselected and is bent in such a way that the first and second housings 112 and 114 are in a staggered side-by-side relationship for a different visual impact from that of FIG. 11.

In FIG. 13, a flexible cable 148 has a first end 150 received through the opening 134 of the first housing 112 and has a second end 152 received in the opening 132 of the second housing 114. The length of the cable is preselected to any desired length and is bent in such a way that the first and second housings 112 and 114 are in a direct side-by-side relationship for a yet different visual impact from the visual impacts shown in FIGS. 11 and 12.

Although an illumination device as shown in FIGS. 11–13 is limited to two housings each including two interconnection openings, the illumination device may include three or more housings with each housing including three or more openings. Furthermore, a plurality of interconnection openings of each housing may be used simultaneously by power cords so that a primary housing may simultaneously transmit power directly to two or more secondary housings, or a secondary housing may simultaneously receive power from either a primary or secondary housing, and transmit power to one or more secondary housings. Obviously the length and flexibility of the power cords coupled with the number and location of available interconnection openings permits an almost infinite variety of relative positions among the housings for a desired visual impact.

Figure 14:
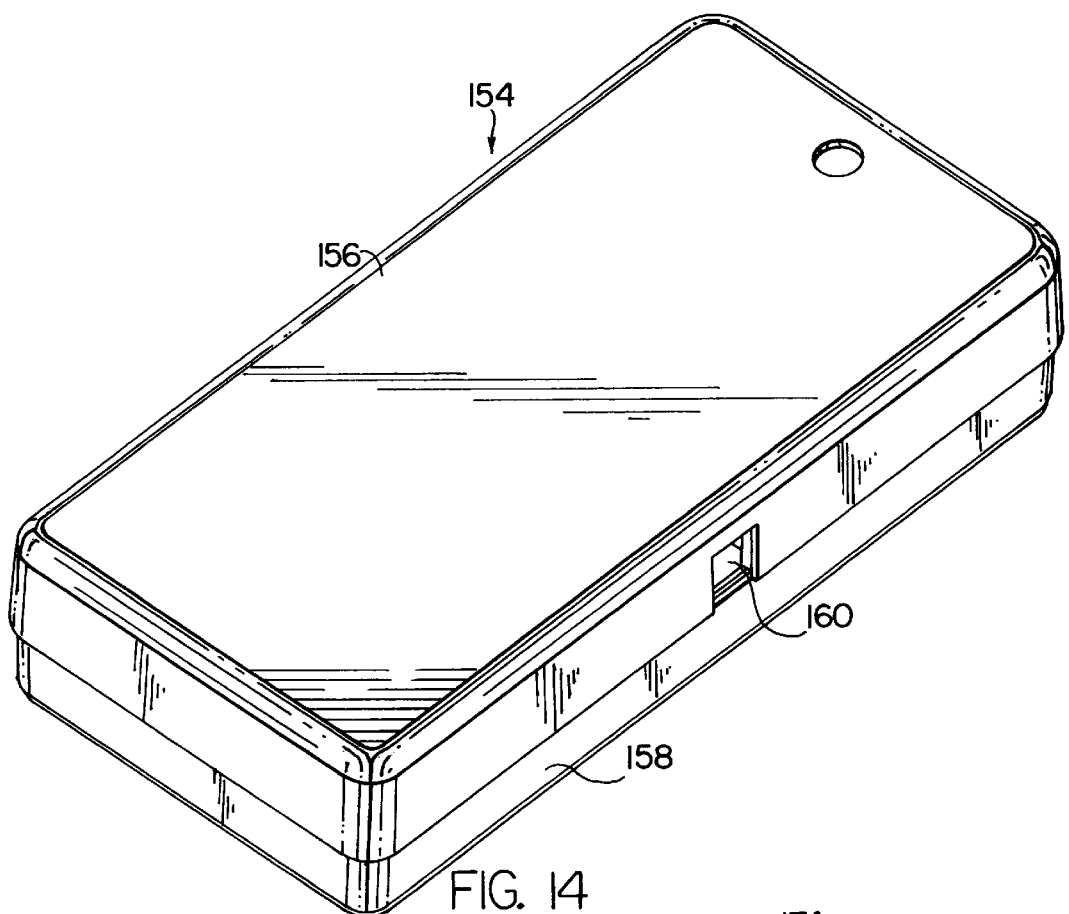
FIG. 14 is an outside perspective view illustrating an interconnectable housing.

With reference to FIGS. 14–24, the construction of the interconnectable housings of an embodiment of the present invention will be described in greater detail. FIG. 14 shows an interconnectable housing 154 comprising a transparent cover 156, a front cover immediately beneath the transparent cover (not shown so as to simplify drawing), and a base 158 with an optional battery door (not shown) within the base. As will be further illustrated in the following drawings, the transparent cover and front cover both define two interconnection openings, such as opening 160, such that each opening may simultaneously receive a power-cord terminal to permit a primary housing to power one or more remote, secondary housings.

Figure 15:
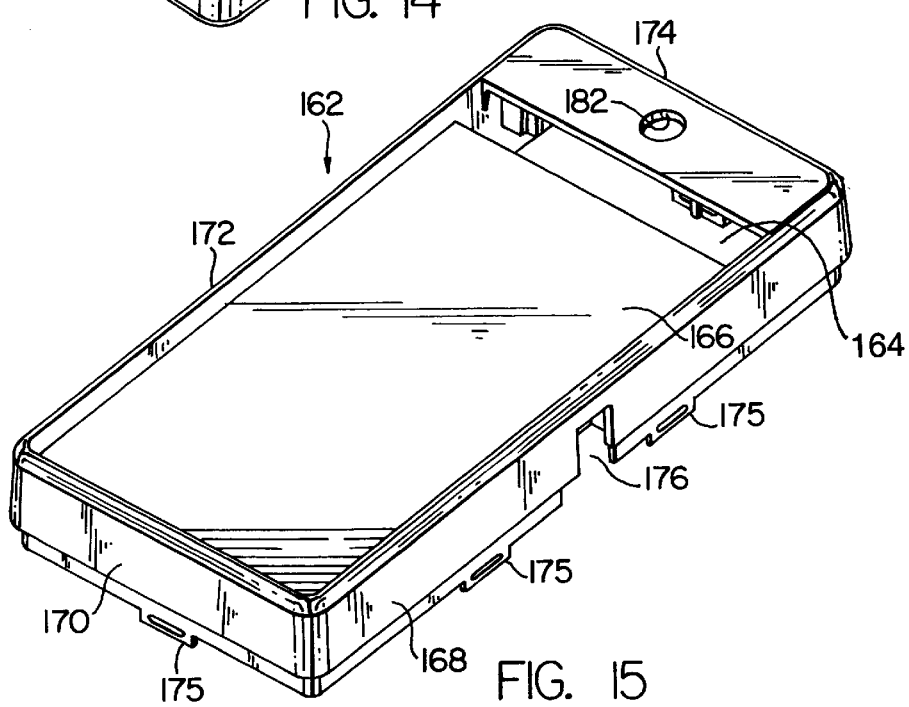
FIG. 15 is an outside perspective view of a front cover of the interconnectable housing.
Figure 16:
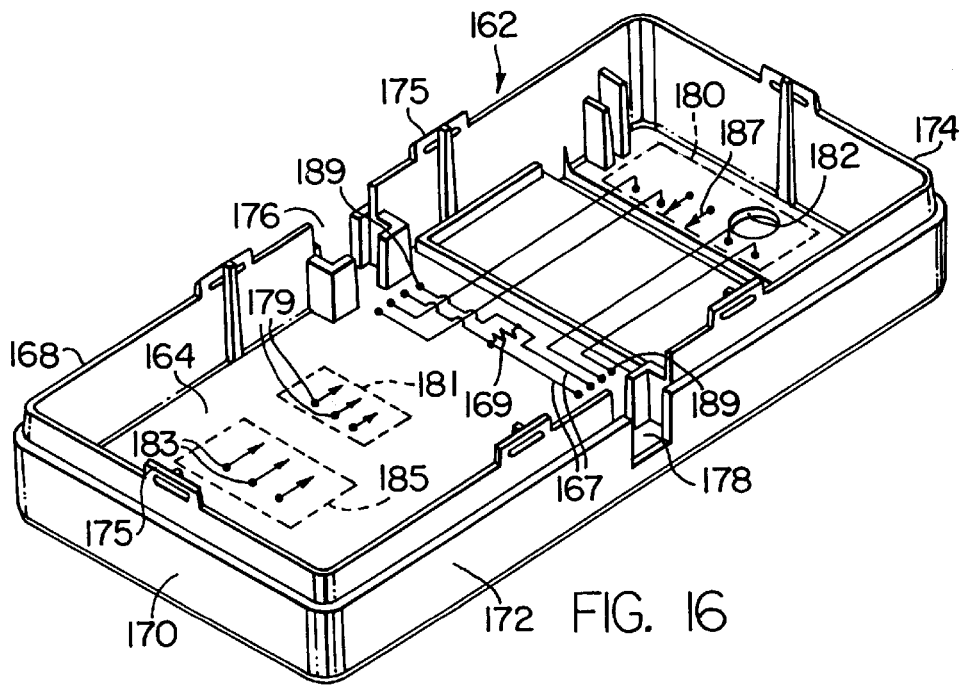
FIG. 16 is a schematic inside perspective view of the front cover of FIG. 15.

FIGS. 15 and 16 respectively illustrate an outside and a schematic inside perspective view of a front cover 162 of the interconnectable housing 154. The front cover includes a support surface 164 for holding an electroluminescent lamp 166, and further includes sidewalls 168,170,172 and 174 each extending in planes transverse to that of the support surface 166. Positioning protrusions 175,175 extend downwardly from open-ended edges of the sidewalls, and are located periodically around the perimeter of the front cover for engaging with and positioning the front cover over a base. The sidewalls 168 and 172 of the front cover 162 respectively define interconnection openings 176 and 178 for receiving power cords (not shown) to transmit power from a primary housing or to receive power therefrom.

In a first scenario in which the interconnectable housing 154 is coupled either directly or indirectly to a primary housing, the electroluminescent lamp 166 will be activated by a remote light sensing circuit located in a primary housing via a power cord received in one or more of the interconnection openings 176 and 178. The interconnection openings are internally coupled together by conductors 167,167 so that power received through either of the interconnection openings may be transmitted to other secondary housings via the other interconnection opening. The electroluminescent lamp within the housing is connected between the conductors 167,167 (shown schematically by a resistance 169) to receive power.

In a second scenario in which the case assembly 154 is a primary housing, a light sensing circuit will be provided in the housing 154 and preferably located in the dashed area 180 of the front cover 162. The primary housing may also include AC power terminals 179,179 within the dashed lines 181 for directly receiving power from an AC source, and for coupling the power to the light sensing circuit. The light sensing circuit may also be powered by terminals 183,183 from a DC power source such as a battery cooperating with an inverter (DC to AC converter) located within the dashed lines 185. (Of course the locations of the light sensing circuit, AC power terminals and DC power source are shown schematically for illustration purposes only, and may be provided at other convenient locations within the housing.)

The light sensing circuit provided with the primary housing includes conductors 187,187 for communicating with and activating its own electroluminescent lamp 166, and includes terminals 189,189 coupled to interconnection openings 176 and 178 for externally communicating power to remote lamps in secondary housings via one or more power cords received at one end in one or more of the interconnection openings 176 and 178 of the primary housing, and received at the other end in associated openings in the secondary housings.

The front cover 162, when used as a primary housing, further defines a light opening 182 so that light may enter the opening from the outside and impinge on a light sensing circuit provided within the interconnectable housing. Obviously, secondary housings need not provide a hole for receiving light since the secondary housings are powered from the primary housing.

Figure 17:
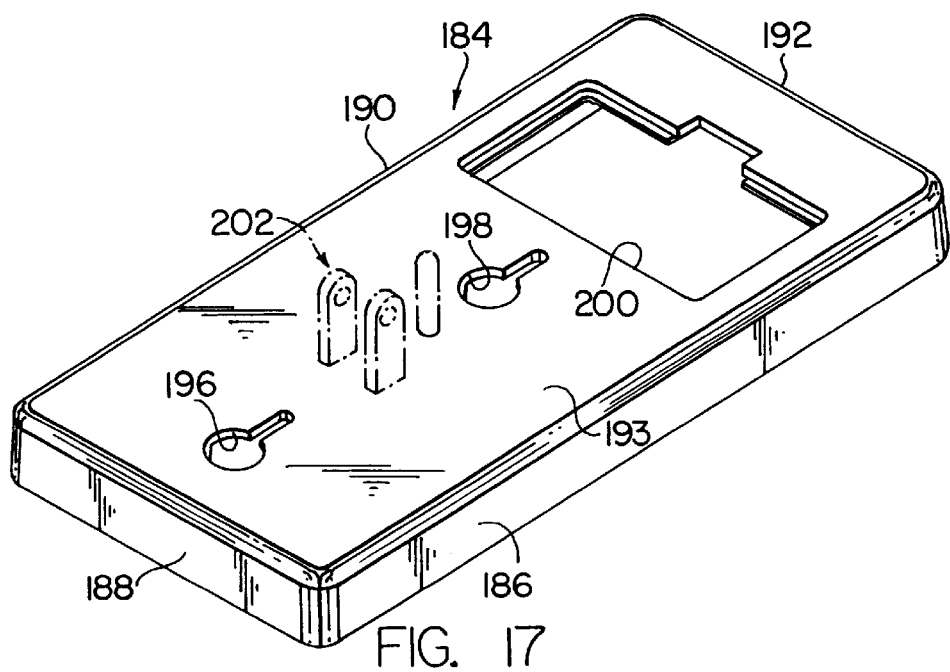
FIG. 17 is an outside perspective view of a base of the interconnectable housing.

FIGS. 17 and 18 respectively illustrate outside and inside perspective views of a base 184 comprising part of the interconnectable housing 154 shown in FIG. 14. The base includes sidewalls 186,188,190 and 192 each extending inwardly from and in planes transverse to that of an attaching surface 193. Positioning recesses 194,194 defined in the sidewalls are located periodically around the perimeter of the base 184 for mating with corresponding positioning protrusions on the front cover. The base also defines key holes 196 and 198 for receiving means for attaching the base 184 to a structure such as the front face of a residential house. The means for attaching may include screws, bolts, suction cups, adhesive, or the like. The base preferably defines an opening 200 for receiving a detachable battery door for gaining access to the inside of the housing when employing a DC battery (see FIGS. 19 through 23). The base may also include an electrical plug 202 shown by dashed lines extending outwardly from the attaching surface 193 for directly plugging the housing into an AC receptacle, for example, when used as a night light with or without indicia in a bedroom or bathroom. The night light may also be used with interconnectable housings so as to increase the area of illumination emitted therefrom.

Figure 21:
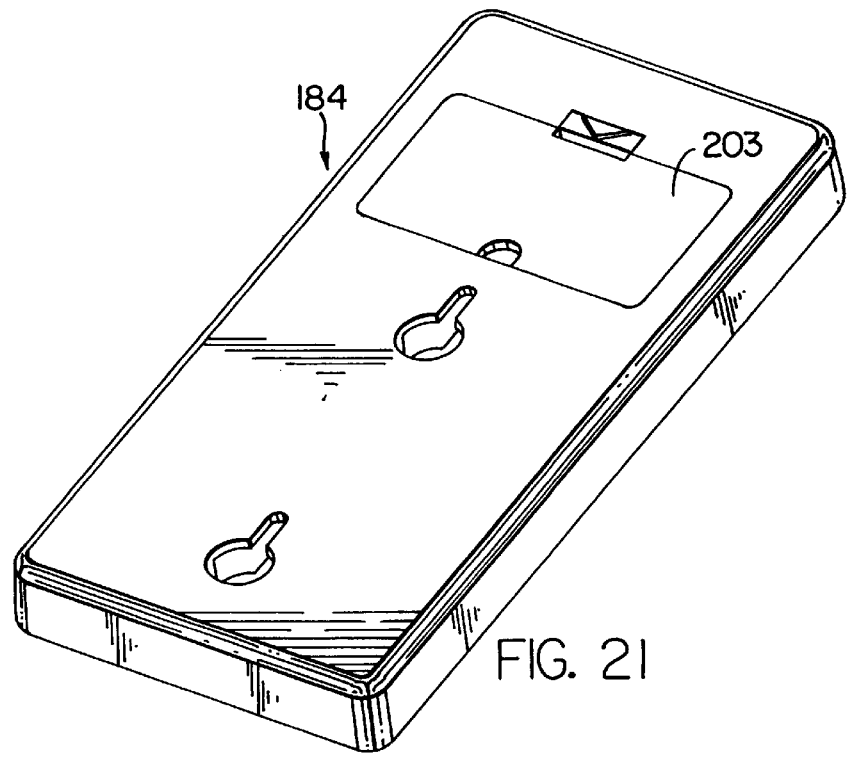
FIG. 21 is an outside perspective view of the battery door inserted on the base.
Figure 22:
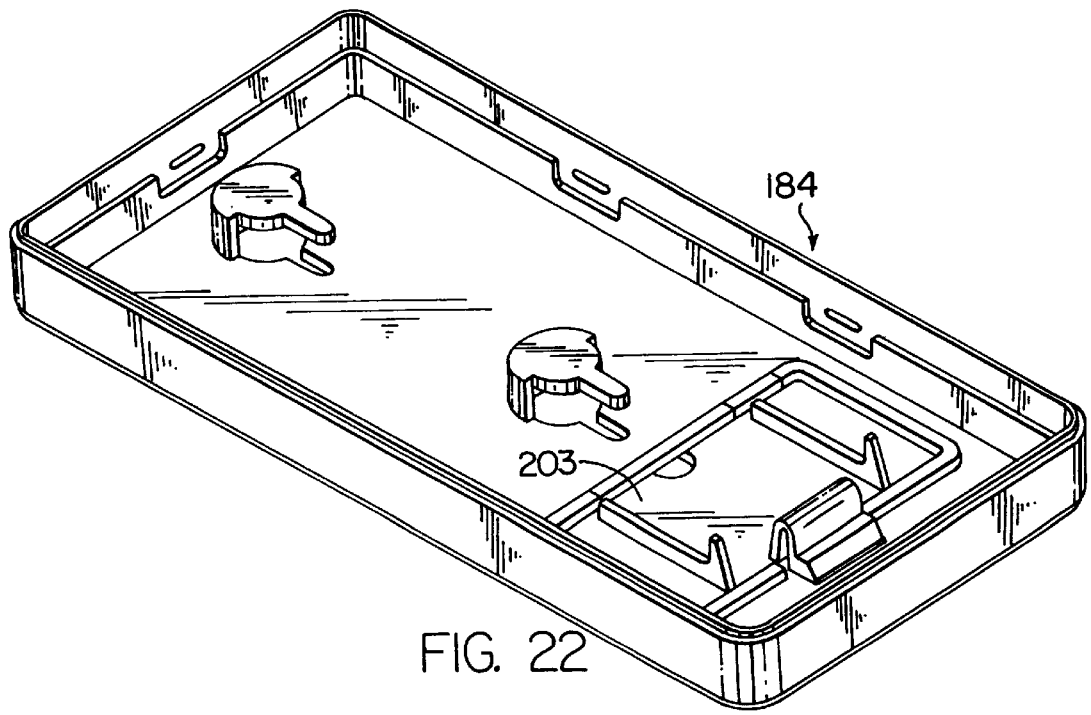
FIG. 22 is an inside perspective view of the battery door and base of FIG. 21.

Referring to FIGS. 19 through 23, a battery door 203 including positioning protrusions 204,204 and handle 206 is illustrated separately (FIGS. 19 and 20) and as inserted in the base 184 (FIGS. 21 and 22).

Figure 23:
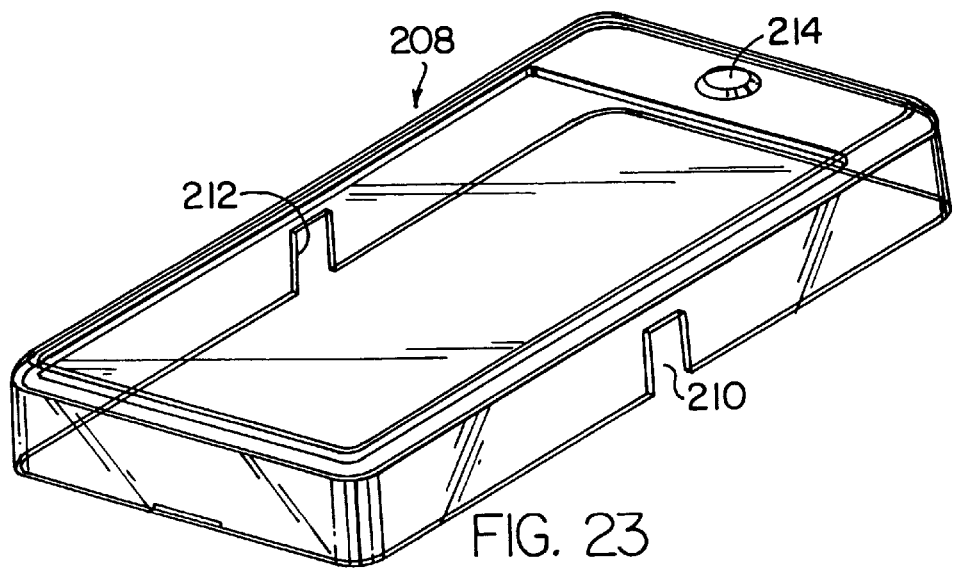
FIG. 23 is an outside perspective view of a transparent cover of the interconnectable housing.
Figure 24:
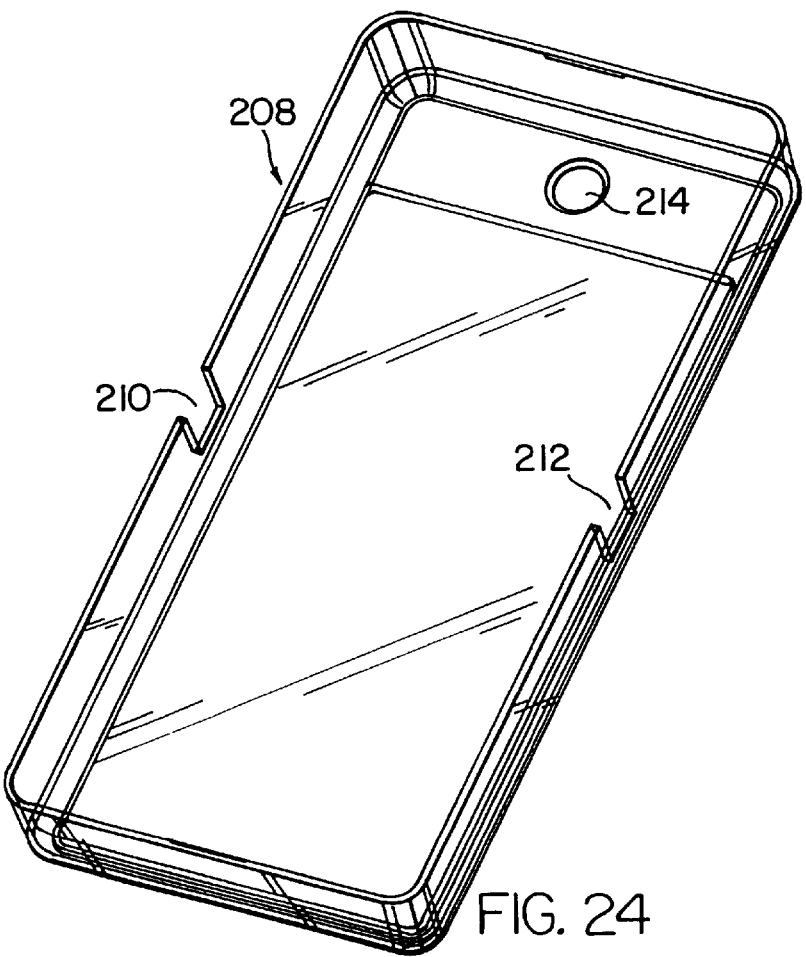
FIG. 24 is an inside perspective view of the transparent cover of FIG. 23.

FIGS. 23 and 24 respectively illustrate outside and inside perspective views of a transparent cover 208 which may be used for fitting over the front cover and protecting the otherwise exposed electroluminescent lamp. The transparent cover defines interconnectable openings 210 and 212 that coincide and cooperate with the respective openings 176 and 178 on the front cover to form a single opening, such as the opening 160 shown in FIG. 14. The transparent cover may include a magnifying lens 214 which lies in an overlying relationship with the light opening 182 in the front cover 162 so as to magnify incoming light for impinging on a light sensing circuit.

By the foregoing, an improved illumination device has been described by way of the illustrative embodiments. However, it should be understood that numerous modifications and substitutions may be made without departing from the spirit or scope of the invention. Accordingly, the invention has been described by way of illustration rather than limitation.

I claim:

1. An illumination system comprising:

first and second electrical paths to be powered by a power source for lighting at least one light source, the power source to generate a periodically repeating signal having within each period a first half-cycle and a second half-cycle, the first and second electrical paths respectively to conduct the first and second half-cycles of power to the light source;

current regulating means including means sensitive to light intensity, the current regulating means interposed along one of the first and second paths, the light-sensitive means generating a relatively low electrical resistance when the intensity of light impinging on the light-sensitive means is above a predetermined triggering level, the relatively low resistance causing the current regulating means to substantially block one of the half-cycles to be conducted along the path with the current regulating means interposed therealong so that the light source receives one-half of the cycles from the power source and provides less than a threshold level of visual illumination, and the light-sensitive means generating a relatively high electrical resistance when the intensity of light impinging on the light-sensitive means is below a predetermined triggering level, the relatively high resistance causing the current regulating means to substantially permit said one of the half-cycles to be conducted along the path with the current regulating means interposed therealong so that the light source receives the first and second half cycles from the power source and provides greater than the threshold level of visual illumination.

2. The system as defined in claim 1, wherein the light-sensitive means is a photocell.

3. The system as defined in claim 1, further including at least one light source electrically coupled to the light-sensing circuit.

4. The system as defined in claim 3, wherein the at least one light source is an electroluminescent lamp.

5. An illumination system comprising:

a light sensing circuit including a photocell to be energized by a power source; and at least one housing each for supporting at least one electroluminescent lamp, and each housing including at least one means for communicating electric power from the light sensing circuit to the at least one electroluminescent lamp;

the light sensing circuit transmitting via the means for communicating a predetermined amount of electric power to the at least one electroluminescent lamp to provide greater than a threshold level of visual illumination from the electroluminescent lamp when the intensity of light impinging on the photocell is below a predetermined triggering level, and the light sensing circuit transmitting a portion of the predetermined amount of electric power to the electroluminescent lamp to provide less than the threshold level of visual illumination from the electroluminescent lamp when the intensity of light impinging on the photocell is above a predetermined triggering level.

6. System as defined in claim 5, wherein at least one means for communicating associated with a housing includes means for transmitting power from a light sensing circuit provided with the housing to at least one electroluminescent lamp provided with the housing.

7. System as defined in claim 5, wherein at least one means for communicating associated with a housing includes means for transmitting power from a light sensing circuit provided with the housing to at least one electroluminescent lamp provided externally to the housing.

8. System as defined in claim 5, wherein the housing includes means for communicating with an alternating current power source.

9. System as defined in claim 5, wherein the housing includes means for communicating with a direct current power source.

10. System as defined in claim 9, further including means for converting direct current into alternating current.

11. System as defined in claim 5 wherein the at least one housing comprises a primary housing for providing the light sensing circuit, and at least one secondary housing for receiving power from the light sensing circuit.

12. System as defined in claim 11, wherein the primary housing and at least one secondary housing are coupled to one another by one or more flexible power connectors received by the interconnectable openings of the housings, the length and flexibility of the connectors enabling variable positions of the housings relative to each other.

13. A circuit for turning a lighting device on or off, comprising:

means for variably resisting a current flow between a first and second terminal, the first terminal of the means for variably resisting to be coupled to a first terminal of an alternating current (AC) power supply;

first means for uni-directionally permitting a current flow from an input terminal to an output terminal and for blocking a current flow from its output terminal to its input terminal, the input terminal of the first means to be coupled to the second terminal of the means for variably resisting;

means for resisting a current flow between a first terminal and a second terminal, the first terminal of the means for resisting coupled to the second terminal of the means for variably resisting, and the second terminal of the means for resisting coupled to the output terminal of the first means;

second means for uni-directionally permitting a current flow from an input terminal to an output terminal when a sufficient voltage is applied to a control terminal, and for blocking a current flow from its output terminal to its input terminal, the input terminal of the second means coupled to the output terminal of the first means, the output terminal of the second means coupled to the first terminal of the means for variably resisting, and the control terminal of the second means coupled to the second terminal of the means for variably resisting; and one or more light sources each having first and second terminals, the first terminals of the one or more light sources coupled to one another and the second terminals of the one or more light sources coupled to one another to place the light sources in parallel to one another, the first terminals of the one or more light sources also coupled to the output terminal of the first means, and the second terminals of the one or more light sources to be coupled to the second terminal of the power supply, during a first half cycle of the AC power supply when the second terminal of the power supply is positive with respect to the first terminal of the power supply and the means for variably resisting is set above a predetermined level, a current flowing through the means for resisting and the means for variably resisting establishes a sufficient bias voltage from the control terminal of the second means relative to its output terminal to turn on the second means and produce a substantial current flow from the second terminal of the power supply, through the light sources from the second terminal to the first terminal of the light sources, through the second means and to the first terminal of the power supply, and during a second half cycle of the power supply when the first terminal of the power supply is positive with respect to the second terminal of the power supply, the second means turns off to be non-conductive and a substantial current flow is established from the first terminal of the power supply, through the means for variably resisting, through the first means, through the light sources from the first terminals to the second terminals of the light sources and to the second terminal of the power supply, thereby providing substantial fullwave current to the light sources to generate maximum lighting of the light sources, and during a first half cycle of the AC power supply when the second terminal of the power supply is positive with respect to the first terminal of the power supply and the means for variably resisting is set below a predetermined level, a current flowing through the means for resisting and the means for variably resisting establishes an insufficient bias voltage from the control terminal of the second means relative to its output terminal to turn on the second means, whereby the second means is off and non-conductive and the means for resisting being of a sufficiently high resistance so that minimal current flows from the second terminal of the power supply, through the light sources from the second terminals to the first terminals of the light sources, through the means for resisting and the means for variably resisting and to the first terminal of the power supply so that the light sources are in-effect not lighted during the first AC half cycle, and during a second half cycle of the power supply when the first terminal of the power supply is positive with respect to the second terminal of the power supply, current flows through the light sources similar to when the means for variably resisting is set below a predetermined level, whereby half-wave current flows through the light sources to in-effect establish the light sources in an off condition.

14. A circuit as defined in claim 13, wherein the means for variably resisting is a photocell.

15. A circuit as defined in claim 13, wherein the first means is a diode.

16. A circuit as defined in claim 13, wherein the means for resisting a current flow is a resistor.

17. A circuit as defined in claim 13, wherein the second means is a silicon-controlled rectifier (SCR).

18. A circuit as defined in claim 13, wherein the one or more light sources are one or more electroluminescent lamps.

19. A circuit for automatically turning a lighting device on or off depending on the level of brightness external to the device, the circuit comprising:

a photocell including a first terminal and a second terminal, the first terminal to be coupled to a first terminal of an alternating current (AC) power supply;

a diode including an anode and a cathode, the anode of the diode coupled to the second terminal of the photocell;

a resistor including a first terminal and a second terminal, the first terminal of the resistor coupled to the second terminal of the photocell, and the second terminal of the resistor coupled to the cathode of the diode;

a silicon-controlled rectifier (SCR) including an anode, a cathode and a gate, the anode of the SCR coupled to the cathode of the diode, the cathode of the SCR coupled to the first terminal of the photocell, and the gate of the SCR coupled to the second terminal of the photocell; and one or more light sources each having first and second terminals, the first terminals of the one or more light sources coupled to one another, the second terminals of the one or more light sources coupled to one another to place the light sources in parallel to one another, the first terminals of the one or more light sources also coupled to the cathode of the diode, and the second terminals of the one or more light sources to be coupled to the second terminal of the power supply, during a first half cycle of the AC power supply when the second terminal of the power supply is positive with respect to the first terminal of the power supply and the level of the intensity of light impinging on the photocell is below a predetermined level, the photocell generates a relatively high resistance so that current flowing through the resistor and the photocell establishes a sufficient bias voltage from the gate of the SCR relative to its cathode to turn on the SCR and establish a substantial current flow from the second terminal of the power supply, through the light sources from the second terminal to the first terminal of the light sources, through the SCR and to the first terminal of the power supply, and during a second half cycle of the power supply when the first terminal of the power supply is positive with respect to the second terminal of the power supply, the SCR turns off to be non-conductive and a substantial current flow is established from the first terminal of the power supply, through the photocell, through the diode, through the light sources from the first terminals to the second terminals of the light sources and to the second terminal of the power supply, thereby providing substantial full-wave current to the light sources to generate maximum lighting of the light sources when the level of light intensity impinging on the photocell is below a predetermined level, and during a first half cycle of the AC power supply when the second terminal of the power supply is positive with respect to the first terminal of the power supply and the level of intensity of light impinging on the photocell is above a predetermined level, the photocell generates a sufficiently low resistance with respect to the resistor so that current flowing through the resistor and the photocell establishes an insufficient bias voltage from the gate of the SCR relative to its cathode to turn on the SCR, whereby the SCR is off and non-conductive and the resistor is of a sufficiently high resistance so that minimal current flows from the second terminal of the power supply, through the light sources from the second terminals to the first terminals of the light sources, through the resistor and the photocell and to the first terminal of the power supply so that the light sources are in-effect not lighted during the first AC half cycle, and during a second half cycle of the power supply when the first terminal of the power supply is positive with respect to the second terminal of the power supply, current flows through the light sources similar to when the level of light intensity impinging on the photocell is below a predetermined level, whereby half-wave current flows through the light sources to in-effect establish the light sources in an off condition.

20. A circuit as defined in claim 19, wherein the resistor is about one million ohms and the photocell has a resistance ranging from about two thousand ohms in full-light conditions to about forty thousand ohms in no-light conditions.

21. A circuit as defined in claim 19, wherein the one or more light sources are one or more electroluminescent lamps.

22. A circuit as defined in claim 19, wherein the circuit is to be coupled to a 120 volt AC, 60 Hertz power supply.

23. A circuit as defined in claim 19, wherein the diode is a 1N4004 diode.

24. A circuit as defined in claim 19 further including a three-position switch to be interposed between a first terminal of a power supply and the first terminal of the photocell, the switch having a first position to couple the first terminal of the power supply to the first terminal of the photocell to establish the circuit in an automatic operation mode, the switch having a second position to couple the first terminal of the power supply to the first terminals of the light sources to power the light sources regardless of the level of intensity of light impinging the photocell, and the switch having a third position to opencircuit the first terminal of the power supply to cut power to the light sources regardless of the level of intensity of light impinging on the photocell.

25. An illumination device comprising:

a housing having a base and at least one transparent cover member;

a support located within the housing and adjacent to the cover member;

one or more light source located within the housing and having a top surface and a bottom surface, the bottom surface supported by the supporting surface and the top surface for projecting light through the cover member;

means for releasably connecting the one or more light sources to a power supply; and at least one mask layer having opaque and transparent regions for covering the one or more of the light sources to selectively block light emanating from the light sources to define indicia; and a circuit for automatically turning a lighting device on or off depending on the level of brightness external to the device, the circuit comprising:

a photocell including a first terminal and a second terminal, the first terminal to be coupled to a first terminal of an alternating current (AC) power supply;

a diode including an anode and a cathode, the anode of the diode coupled to the second terminal of the photocell;

a resistor including a first terminal and a second terminal, the first terminal of the resistor coupled to the second terminal of the photocell, and the second terminal of the resistor coupled to the cathode of the diode; and a silicon-controlled rectifier (SCR) including an anode, a cathode and a gate, the anode of the SCR coupled to the cathode of the diode, the cathode of the SCR coupled to the first terminal of the photocell, and the gate of the SCR coupled to the second terminal of the photocell, the one or more light sources each having first and second terminals, the first terminals of the one or more light sources coupled to one another, the second terminals of the one or more light sources coupled to one another to place the light sources in parallel to one another, the first terminals of the one or more light sources also coupled to the cathode of the diode, and the second terminals of the one or more light sources to be coupled to the second terminal of the power supply, during a first half cycle of the AC power supply when the second terminal of the power supply is positive with respect to the first terminal of the power supply and the level of the intensity of light impinging on the photocell is below a predetermined level, the photocell generates a relatively high resistance so that current flowing through the resistor and the photocell establishes a sufficient bias voltage from the gate of the SCR relative to its cathode to turn on the SCR and establish a substantial current flow from the second terminal of the power supply, through the light sources from the second terminal to the first terminal of the light sources, through the SCR and to the first terminal of the power supply, and during a second half cycle of the power supply when the first terminal of the power supply is positive with respect to the second terminal of the power supply, the SCR turns off to be non-conductive and a substantial current flow is established from the first terminal of the power supply, through the photocell, through the diode, through the light sources from the first terminals to the second terminals of the light sources and to the second terminal of the power supply, thereby providing substantial full-wave current to the light sources to generate maximum lighting of the light sources when the level of light intensity impinging on the photocell is below a predetermined level, and during a first half cycle of the AC power supply when the second terminal of the power supply is positive with respect to the first terminal of the power supply and the level of intensity of light impinging on the photocell is above a predetermined level, the photocell generates a sufficiently low resistance with respect to the resistor so that current flowing through the resistor and the photocell establishes an insufficient bias voltage from the gate of the SCR relative to its cathode to turn on the SCR, whereby the SCR is off and non-conductive and the resistor is of a sufficiently high resistance so that minimal current flows from the second terminal of the power supply, through the light sources from the second terminals to the first terminals of the light sources, through the resistor and the photocell and to the first terminal of the power supply so that the light sources are in-effect not lighted during the first AC half cycle, and during a second half cycle of the power supply when the first terminal of the power supply is positive with respect to the second terminal of the power supply, current flows through the light sources similar to when the level of light intensity impinging on the photocell is below a predetermined level, whereby half-wave current flows through the light sources to in-effect establish the light sources in an off condition.

* * * * *